Re. 24664

April 23, 1957  R. A. GOEPFRICH  2,789,578
VALVE DEVICE FOR FLUID PRESSURE SYSTEM
Filed Dec. 5, 1950  2 Sheets-Sheet 1

INVENTOR.
RUDOLPH A. GOEPFRICH
BY
T. J. Plante
ATTORNEY

April 23, 1957  R. A. GOEPFRICH  2,789,578
VALVE DEVICE FOR FLUID PRESSURE SYSTEM
Filed Dec. 5, 1950  2 Sheets-Sheet 2

INVENTOR.
RUDOLPH A. GOEPFRICH
BY
T. J. Plante
ATTORNEY

2,789,578

VALVE DEVICE FOR FLUID PRESSURE SYSTEM

Rudolph A. Goepfrich, South Bend, Ind., assignor to Bendix Aviation Corporation, South Bend, Ind., a corporation of Delaware Application December 5, 1950, Serial No. 199,331

7 Claims. (Cl. 137—493.1)

This invention relates to a valve device of the type often referred to in the hydraulic brake art as a "residual pressure check valve." Residual pressure check valves are double-acting valve devices which permit free flow of fluid from the master cylinder toward the wheel cylinders, but resist the return flow sufficiently to insure against a pressure drop in the lines which might draw air into the system.

Residual pressure check valves are being used in almost all of the hydraulic brake systems presently applied to road vehicles. The two types of check valves being manufactured are based on those disclosed in Bowen Patent No. 1,841,354 and Loweke Patent No. 1,985,936.

The general object of the present invention is to provide an improved form of residual pressure check valve; one which is less expensive to manufacture than previously suggested designs, and which is also more reliable in operation than some of the earlier designs. For example, my improved check valve has fewer parts than the check valve disclosed in Patent No. 1,841,354, and it is more efficient than the check valve of Patent No. 1,985,936, because the rubber member provides a tighter seal and cannot, under any pressure surge, be dislodged from its engagement with the metal backing member.

The improved valve device consists of a rigid disk member and a resilient member stretched over the rigid member and gripping the periphery thereof, the resilient member serving the dual function of acting as a flap valve to control fluid flow through the valve device and as a resilient seat-engaging surface to control fluid flow around the valve device.

The above and other objects and features of the invention will appear more fully hereinafter from a consideration of the following description, taken in connection with the accompanying drawings, wherein an embodiment of the invention is illustrated by way of example. In the drawings.

Figure 1:
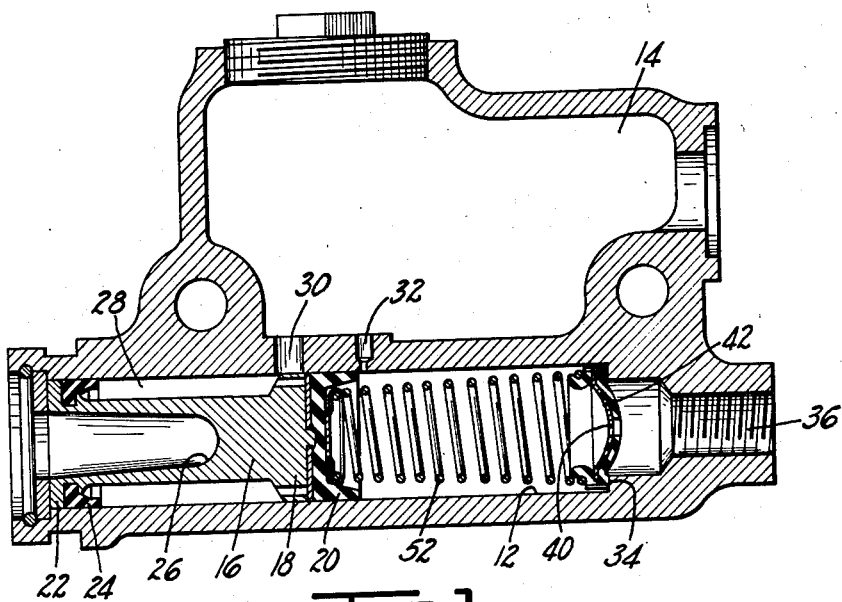
Figure 1 is a longitudinal section of a master cylinder assembly provided with my improved check valve device.
Figures 2, 3:
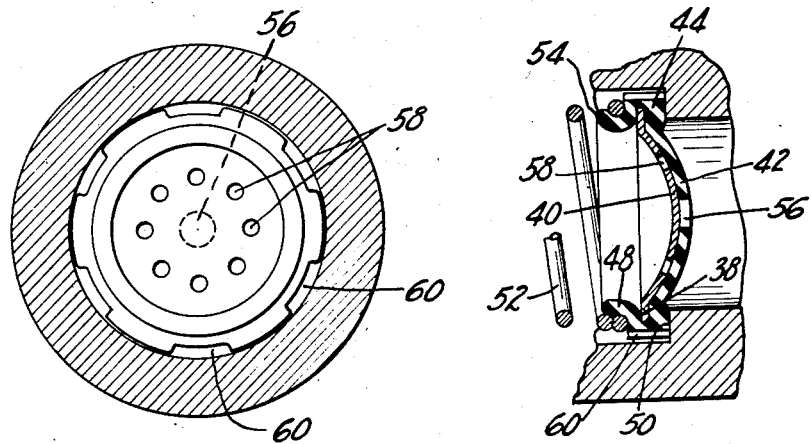
Figure 2 is an enlargement of the portion of Figure 1 which shows the check valve device.
Figure 3 is an end view of the check valve device, as seen from the inside of the master cylinder, the coil spring being omitted.

The master cylinder illustrated in Figure 1 consists of the usual casting having a cylinder bore 12 and a reservoir chamber 14. A piston 16, of conventional shape, is reciprocably mounted in bore 12. The head 18 of the piston carries a rubber sealing cup 20, and the skirt 22 of the piston carries a rubber sealing ring 24. A recess 26 is provided in the rear of the piston to receive an actuating rod.

The annular chamber 28 between the head and skirt of the piston is connected to reservoir chamber 14 through supply port 30, which remains open throughout the stroke of the piston. When the piston is in retracted position, as shown, the lip of cup 20 is just behind compensating port 32, which permits communication between reservoir chamber 14 and bore 12 ahead of the piston. When the piston moves forward on its pressure stroke, the lip of sealing cup 20 covers compensating port 32 to prevent pressure fluid from escaping to the reservoir.

In the illustrated arrangement, my improved check valve device is located at the front end of cylinder bore 12. An annular shoulder 34 provides a valve seat for the check valve device, which is located between the pressure chamber of the master cylinder and discharge port 36 connected to the wheel cylinders. Although the illustrated location is the preferred location of the check valve device, it could accomplish its purpose (at least partially) if it were located anywhere between the master cylinder piston and the wheel cylinder pistons, since it restricts the return flow of fluid in order to prevent leakage of air into the wheel cylinders. Where used in this specification and its associated claims, the term "input end" of the hydraulic system refers to that portion of the system in which pressure is developed by the master cylinder piston, and the term "output end" of the hydraulic system refers to that portion of the system in which pressure is applied to the wheel cylinder pistons.

Figure 4:
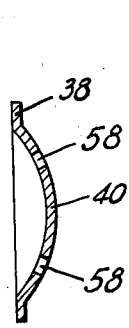
Figures 4 and 5 are sectional views showing, respectively, the rigid member and the resilient member as separate elements prior to being assembled to constitute the check valve device.
Figure 5:
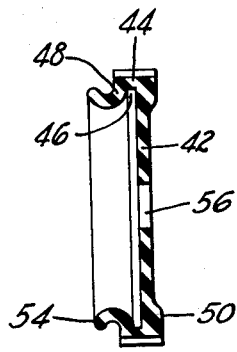

The check valve device consists of two members, which are shown individually (prior to being assembled) in Figures 4 and 5. The member shown in Figure 4 is a stamped metallic disk having a flat peripheral portion 38 and a spherical center portion 40. The member shown in Figure 5 is a rubber diaphragm member which is adapted to be stretched to fit over the metal disk. In order to provide generalized names for each of the two members which will clearly distinguish them from one another without implying unnecessary limitations, I shall refer to the metal disk as a "rigid member," and to the rubber diaphragm as a "resilient member." The words "rigid" and "resilient" are used only to indicate the relative qualities of the two members which make possible their functional cooperation.

In assembling the check valve device, the rigid member is pressed into the open side of the resilient member, stretching the latter until it assumes the shape shown in Figure 1. The center portion 42 of the resilient member is stretched over the convex face of the spherical portion of the rigid member, and the annular outer portion 44 of the resilient member grips the periphery of the rigid member in the groove 46 provided between the front diaphragm portion of the resilient member and its folded-over rear flange 48. The check valve device is mounted in the master cylinder with its convex side facing the output end of the hydraulic system.

The annular surface 50 of the resilient member is urged into engagement with valve seat 34 by return spring 52, which also exerts a force tending to move piston 16 toward its retracted position. In order to facilitate assembling the master cylinder, the resilient member may be provided with an integral rear lip 54, which grips the end coil of spring 52 when the check valve device is twisted onto the end of the spring. With this feature, the spring and check valve device can be handled as a sub-assembly.

The diaphragm portion 42 of the resilient member has a central aperture 56, and the spherical portion 40 of the rigid member has a plurality of apertures 58. The apertures 58 are all laterally (radially) spaced, or offset, from the aperture 56, so that the diaphragm portion of the resilient member normally covers and seals the apertures 58. The tension in the portion of the resilient member which is stretched over the convex face of the rigid member insures an efficient seal.

Figure 6:
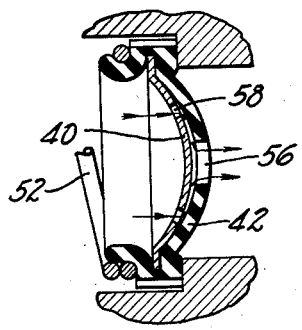
Figures 6 and 7 are sectional views illustrating the operation of the check valve device during the pressure stroke and return stroke of the master cylinder piston.

In operation, when piston 16 is moved on its pressure stroke, the fluid will pass through the small holes 58 in the metal disk and push the rubber diaphragm away from this disk so that the fluid can pass out through the central hole 56 in the rubber diaphragm. The arrows in Figure 6 show the path of fluid flow during the pressure stroke.

Figure 7:
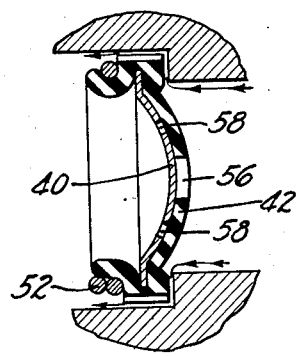

When the brake applying pressure is released, and piston 16 returns to its retracted position, fluid will attempt to flow from the hydraulic lines back into the master cylinder. However, it will only be able to do so against the resistance of spring 52. Since the line pressure holds the rubber diaphragm against the metal disk, fluid can return to the master cylinder only by moving surface 50 of the check valve device away from valve seat 34. The arrows in Figure 7 show the path of fluid flow during the releasing stroke. In order to prevent the cylinder bore from being blocked if the rubber should swell, a plurality of notches 60 may be formed in the periphery of the resilient member.

The retention of a positive pressure in the brake lines during the releasing stroke insures against leakage of air into the system. The check valve also prevents fluid from surging back to the reservoir when the vehicle is being driven on rough roads.

From the foregoing description, it is obvious that my check valve device is easy to manufacture and assemble. Furthermore, the resilient member is secured to the rigid member in such a way that it cannot be accidentally forced into the hydraulic lines due to a surge of fluid pressure.

Although a particular embodiment of my invention has been described, it will be understood by those skilled in the art that the object of the invention may be attained by the use of constructions different in certain respects from that disclosed without departing from the underlying principles of the invention.

I claim:

1. For use in a master cylinder having a discharge port and a valve seat between the discharge port and the interior of the master cylinder, a double-acting valve device comprising a metallic disk member having a flat peripheral portion and a spherical center portion, the convex side of which faces toward the discharge port, a rubber diaphragm member having a center portion stretched over the convex face of the metallic disk and an annular outer portion folded over the periphery of the metallic disk to grip the disk and also to provide a resilient valve-seat-engaging surface, the center portion of said diaphragm having an aperture and the center portion of said disk having one or more apertures which are laterally spaced from the diaphragm aperture and which are covered by the diaphragm except when it is pushed away from the disk by fluid flowing toward the discharge port, and a coil spring acting on the outer portion of the rubber member to urge it into engagement with the valve seat, said rubber member having an integral axially-extending flange provided with a peripheral groove which receives the end coil of the spring.

2. For use in a master cylinder having a discharge port and a valve seat between the discharge port and the interior of the master cylinder, a double-acting valve device comprising a rigid disk member having a flat peripheral portion and a spherical center portion, the convex side of which faces toward the discharge port, a resilient diaphragm member having a center portion stretched over the convex face of the rigid disk and an annular outer portion folded over the periphery of the rigid disk to grip the disk and also to provide a resilient valve-seat-engaging surface, the center portion of said diaphragm having an aperture and the center portion of said disk having one or more apertures which are laterally spaced from the diaphragm aperture and which are covered by the diaphragm except when it is pushed away from the disk by fluid flowing toward the discharge port, and a coil spring acting on the outer portion of the resilient member to urge it into engagement with the valve seat, said resilient member having an integral flange provided with a groove which receives the end coil of the spring.

3. For use in a master cylinder having a discharge port and a valve seat between the discharge port and the interior of the master cylinder, a double-acting valve device comprising a rigid disk member having a flat peripheral portion and a spherical center portion, the convex side of which faces toward the discharge port, a resilient diaphragm member having a center portion stretched over the convex face of the rigid disk and an annular outer portion folded over the periphery of the rigid disk to grip the disk and also to provide a resilient valve-seat-engaging surface, the center portion of said diaphragm having an aperture and the center portion of said disk having an aperture which is laterally spaced from the diaphragm aperture and which is covered by the diaphragm except when it is pushed away from the disk by fluid flowing toward the discharge port, and a spring acting on the resilient member to urge it into engagement with the valve seat.

4. For use in a fluid pressure transmitting system, a double-acting valve device comprising an annular valve seat, a rigid disk member having a flat peripheral portion and a spherical center portion, the convex side of which faces toward the output end of the system, a resilient diaphragm member having a center portion stretched over the convex face of the rigid disk and an annular outer portion folded over the periphery of the rigid disk to grip the disk and also to provide a resilient valve-seat-engaging surface, the center portion of said diaphragm having an aperture and the center portion of said disk having an aperture which is laterally spaced from the diaphragm aperture and which is covered by the diaphragm except when it is pushed away from the disk by fluid flowing from the input end of the system toward the output end of the system, and spring means for urging the resilient member into engagement with the valve seat.

5. A double-acting valve device comprising an annular valve seat, a rigid member having a flat peripheral portion and a spherical center portion, a resilient member having a center portion stretched over the convex face of the rigid member and an annular outer portion folded over the periphery of the rigid member to grip the latter and also to provide a resilient valve-seat-engaging surface, the resilient member and the rigid member having offset apertures which permit fluid flow through the valve device in one direction only, and spring means for urging the annular outer portion of the resilient member into engagement with the valve seat.

6. For use in a master cylinder having a discharge port and a valve seat between the discharge port and the interior of the master cylinder, a double-acting valve device comprising a rigid disk member having a flat peripheral portion and a spherical center portion, a resilient diaphragm member having a center portion fitting over the convex face of the rigid disk and an annular outer portion folded over the periphery of the rigid disk to grip the disk and also to provide a resilient valve-seat-engaging surface, and a spring positioned on the resilient member to urge it into engagement with the valve seat.

7. A double-acting valve device comprising an annular valve seat, a rigid member having a flat peripheral portion and a spherical center portion, a resilient member having a center portion stretched over the convex face of the rigid member and an annular portion folded over the periphery of the rigid disc to retain said resilient member in stretched position, the resilient member and the rigid member having offset apertures which permit fluid flow through the valve device in one direction only, and spring means positioned on said resilient member for urging the annular outer portion of the resilient member into engagement with the valve seat.

References Cited in the file of this patent

UNITED STATES PATENTS

| | | |
|---|---|---|
| 783,610 | Chaplin | Feb. 28, 1905 |
| 1,423,923 | Eckert | July 25, 1922 |
| 1,885,121 | Loweke | Nov. 1, 1932 |
| 2,133,575 | Rosenberg | Oct. 18, 1938 |
| 2,376,712 | Moran | May 22, 1945 |
| 2,528,796 | Smith | Nov. 7, 1950 |